Figure 1:
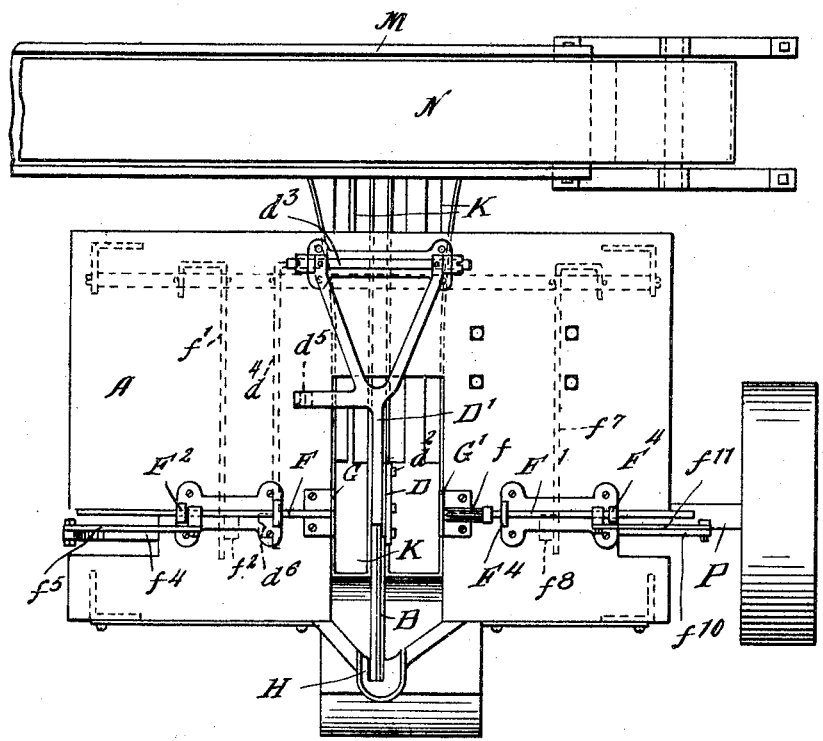

No. 794,598. PATENTED JULY 11, 1905.
S. J. DUNKLEY.
PEACH SPLITTING AND PITTING MACHINE.
APPLICATION FILED NOV. 29, 1904.

2 SHEETS—SHEET 1.

Witnesses:
Wm. Geiger
H. W. Munday

Inventor:
Samuel J. Dunkley
By Munday, Evarts & Adcock,
Attorneys

No. 794,598. PATENTED JULY 11, 1905.
S. J. DUNKLEY.
PEACH SPLITTING AND PITTING MACHINE.
APPLICATION FILED NOV. 29, 1904.

2 SHEETS—SHEET 1.

Witnesses:
Wm. Geiger
H. W. Munday

Inventor:
Samuel J. Dunkley
By Munday, Evarts & Adcock,
Attorneys

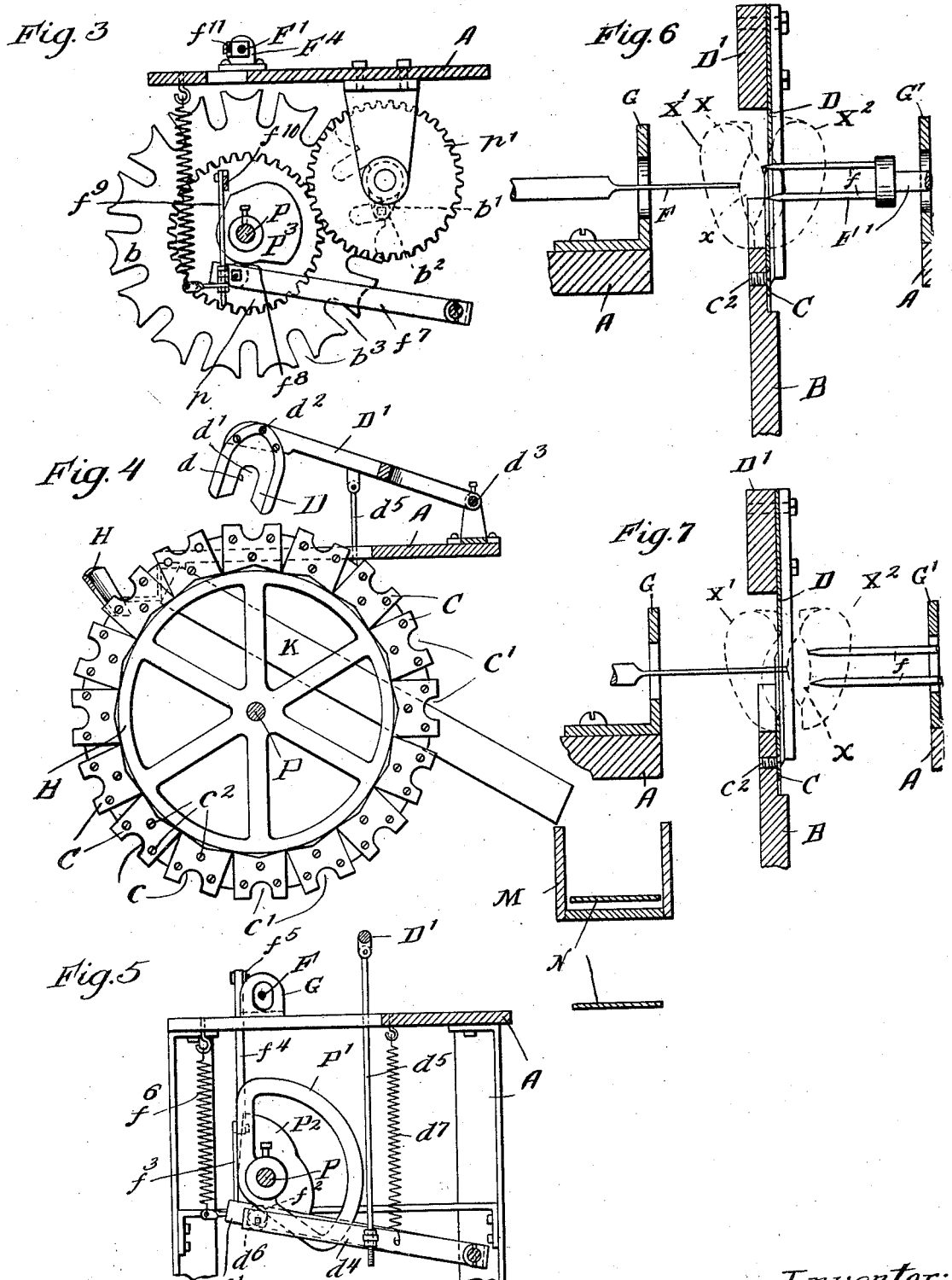

No. 794,598. Patented July 11, 1905.

UNITED STATES PATENT OFFICE.

SAMUEL J. DUNKLEY, OF KALAMAZOO, MICHIGAN, ASSIGNOR TO DUNKLEY COMPANY, OF CHICAGO, ILLINOIS, A CORPORATION OF ILLINOIS.

PEACH SPLITTING AND PITTING MACHINE.

SPECIFICATION forming part of Letters Patent No. 794,598, dated July 11, 1905.

Application filed November 29, 1904. Serial No. 234,714.

*To all whom it may concern:*

Be it known that I, SAMUEL J. DUNKLEY, a citizen of the United States, residing in Kalamazoo, in the county of Kalamazoo and State of Michigan, have invented a new and useful Improvement in Peach Splitting and Pitting Machines, of which the following is a specification.

My invention relates to machines for splitting or halving and pitting peaches.

The object of my invention is to provide a peach splitting and pitting machine of a simple, efficient, and durable construction by means of which peaches may be split or halved and pitted or stoned rapidly and cheaply and without waste, mutilation, or injury to the appearance of the fruit.

My invention consists in the means I employ to practically accomplish this object or result—that is to say, it consists, in connection with an intermittently-rotating knife carrier or wheel having a series of knives mounted peripherally thereon and each having a curved or U-shaped cutting edge, of a coöperating movable knife, likewise having a curved or U-shaped cutting edge, and a pair of movable forks or pitters reciprocating transversely to the plane of the knives and operating to pierce and hold the two halves of the peach and loosen the pit or stone first from one split half of the peach and then from the other split half thereof. One of the pitter-forks preferably has a single tine and the other three tines triangularly disposed. One of the pitter-forks is given or preferably given a double reciprocating movement at each operation, it being first advanced to pierce the peach and engage the pit thereof and then receded to permit the other pitter-fork to free the pit from its half of the peach and then again advanced as the other pitter-fork recedes to free the pit from its half of the peach.

The invention further consists, in connection with these devices, of strippers through which the pitters or forks reciprocate for stripping the split halves of the peach from the pitter-forks.

It further consists, in connection with these parts, of a chute or guide to aid in sticking or placing the peaches one by one on the knives of the carrier-wheel.

It further consists in the novel construction of parts and devices and in the novel combinations of parts and devices herein shown or described.

Figure 2:
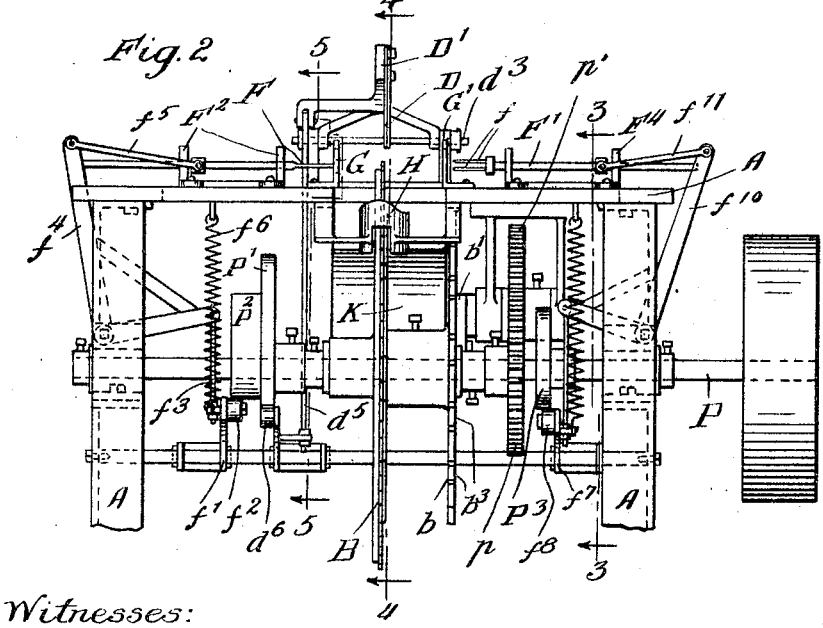
Figure 1:
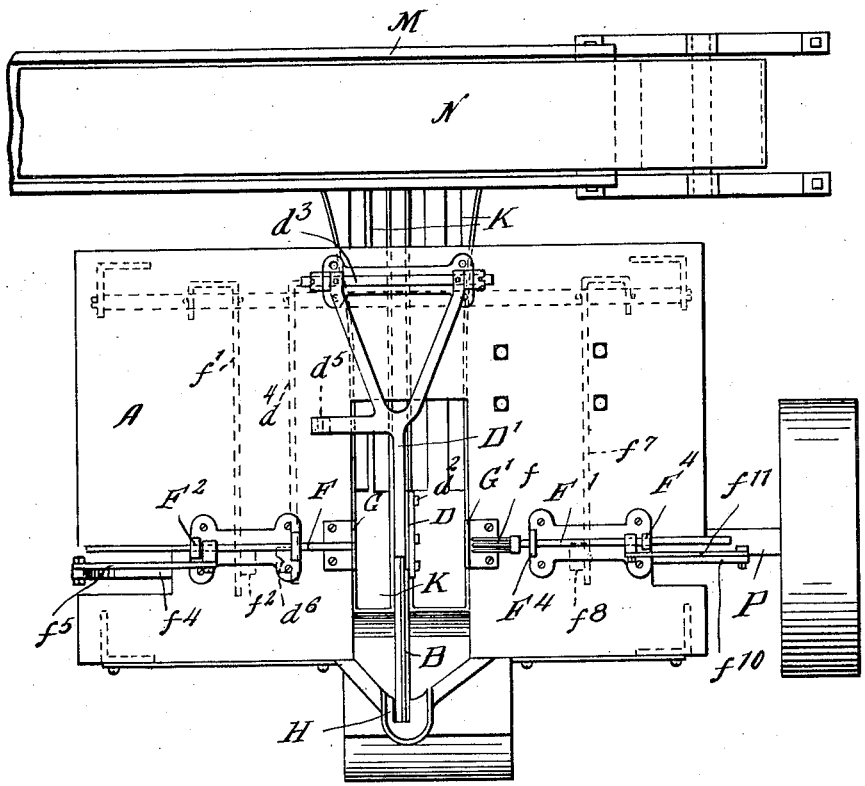
Figure 2:
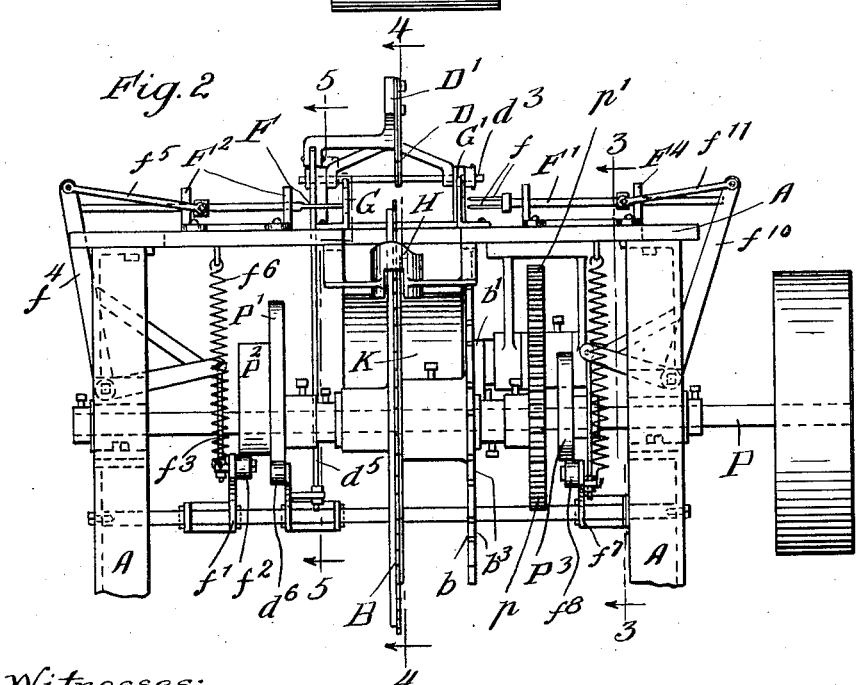

In the accompanying drawings, forming a part of this specification, Figure 1 is a plan view of a peach splitting and pitting machine embodying my invention; Fig. 2, a front elevation. Figs. 3, 4, and 5 are detail vertical sections on lines 3 3, 4 4, and 5 5, respectively, of Fig. 2; and Figs. 6 and 7 are enlarged detail vertical sectional views illustrating the operation.

In the drawings, A represents the frame of the machine.

B is the intermittently-revolving carrier or wheel carrying a series of knives C, each having a hollow, curved, or U-shaped cutting edge $c$, the hollow or cavity $c'$ of the knife being large enough to accommodate the peach pits or stones of the largest size that the machine is intended for operation upon. The knives C are preferably made in separate pieces from the carrier-wheel and removably secured thereto by screws $c^2$.

D is a coöperating movable knife, likewise having a hollow, curved, or U-shaped cutting edge $d$, its U-shaped cavity $d'$ being preferably deeper than the corresponding cavity $c'$ on the knife C, so that the cutting edges of the two knives may reciprocate past or overlap each other without striking the peach pit or stone $x$ of the peach X. The knife D may have any suitable movement for opening and closing it against the coöperating knife C on the carrier-wheel; but it is preferably carried on a vibrating lever D', by which it is operated and to which it is removably secured by screws $d^2$.

F and F' are a pair of transversely-reciprocating pitters or forks, the fork F preferably consisting of a single small tine and the fork F' preferably of three small tines $f$, although a greater or less number of tines may be employed on this fork, if desired.

G and G' are a pair of stationary strippers through which the forks or pitters F F' reciprocate and which serve to strip the two split halves X' X² of the peach from the forks or pitters F F' as the same are withdrawn. The forks or pitters F F' first advance or approach each other to pierce and hold the peach and grasp the pit between them after the movable knife D descends and splits the peach, one of the forks, as F, then further advancing to first disengage the pit $x$ and free it from the split half X of the peach, as illustrated in Fig. 6, while the other fork F' recedes with the pit $x$, and then the fork F recedes as the fork F' further advances to engage the pit $x$ and free it from the other split half X² of the peach, as illustrated in Fig. 7, and then the two forks recede, and thus cause the two halves of the peach to be stripped from the forks by the strippers G G'.

To facilitate the sticking or insertion of the peaches on the knives C of the carrier-wheel, the machine is provided with a peach-guide H. K is a discharge-chute into which the split halves of the peaches and the stones drop after being split and pitted, and M is a conveyer-trough having an endless conveyer N therein for conveying the peaches to the inspecting or filling table, the pits dropping through the slotted chute K.

The required movements may be communicated to the several parts of my machine by any suitable connecting or motion-giving mechanism. The knife carrier or wheel B is preferably intermittently rotated, as required by the ordinary and well-known Geneva stop mechanism, and comprising a radially-slotted disk $b$, connected to rotate with the wheel B, and a continuously-rotating disk $b'$, having a pin $b^2$ engaging the radial slots $b^3$ of the disk $b$. The disk $b'$ is continuously rotated from the driving-shaft P through the gears $p$ on the driving-shaft, and the gear $p'$ on the shaft of the disk $b'$. The knife carrier or wheel B is journaled to rotate on the driving-shaft P.

The lever D', which operates the movable knife D is pivoted to the frame $d^3$ and is vibrated or operated at intervals as required by means of a cam P' on the driving-shaft P, through the connecting-lever $d^4$, pivoted to link $d^5$. The lever $d^4$ has an antifriction-roller $d^6$ engaging the cam P'. A spring $d^7$ serves to hold this roller $d^6$ in engagement with the cam, and thus operates to retract the knife-carrying lever. The reciprocating pitter or fork F is reciprocated as required by means of a cam P² on the driving-shaft P, through the connecting-lever $f'$, having a roller $f^2$ engaging the cam, connecting-link $f^3$, bent lever $f^4$, and pivot-link $f^5$. A spring $f^6$ serves to hold the lever $f'$ in engagement with the cam, and thus to retract the reciprocating pitter or fork F. The movable pitter or fork F' is reciprocated as required by means of the cam P³ on the driving-shaft P, through the connecting-lever $f^7$, having a roller $f^8$ engaging the cam P³, connecting-link $f^9$, bent lever $f^{10}$, and link $f^{11}$. A spring serves to hold the roller $f^8$ in engagement with the cam P³, and thus to retract the fork F'. The fork or pitter F reciprocates in suitable guides F² on the frame of the machine, and similar guides F⁴ are provided for the fork F'.

In operation the attendant places or sticks the peaches one by one on the knives C as the knife-carrier B rotates intermittently. At each stop of the carrier or wheel B the opposing knife D descends and splits the peach, the cavities $c'$ $d'$ of the knives C D accommodating the pit or stone of the peach. As the knife D descends the pitters or forks F F' reciprocate toward each other and pierce the pulp of the peach on opposite sides of the pit or stone $x$ and grasp the pit between the points of the opposing forks. The fork F' after the pulp of the peach is split by the knives into halves pushes the pit $x$ free from the half X² of the peach, the fork F slightly receding during this operation. The fork F' then recedes and the fork F again advances to push the pit $x$ free from the half X' of the peach, and then the fork F recedes and the fork F' continues its receding movement, and both forks are thus stripped from both halves of the peach by the strippers G.

I claim—

1. In a peach pitting and splitting machine, the combination with an intermittently-rotatable knife carrier or wheel, a series of knives, having curved or U-shaped cutting edges mounted thereon, of a coöperating movable knife having a curved or U-shaped cutting edge, and a pair of movable pitters or forks reciprocating transversely to the plane of said knives for freeing the pit first from one half and then from the other half of the split peach, and means for reciprocating said forks transversely substantially as specified.

2. In a peach pitting and splitting machine, the combination with an intermittently-rotatable knife carrier or wheel, a series of knives, having curved or U-shaped cutting edges mounted thereon, of a coöperating movable knife having a curved or U-shaped cutting edge, and a pair of movable pitters or forks reciprocating transversely to the plane of said knives for freeing the pit first from one half and then from the other half of the split peach, one of said pitters or forks having a plurality of tines, and means for reciprocating said forks transversely substantially as specified.

3. In a peach pitting and splitting machine, the combination with an intermittently-rotatable knife carrier or wheel, a series of knives, having curved or U-shaped cutting edges mounted thereon, of a coöperating movable knife having a curved or U-shaped cutting edge, and a pair of movable pitters or forks reciprocating transversely to the plane of said knives for freeing the pit first from one half and then from the other half of the split peach, one of said pitters or forks having a double reciprocating movement at each operation, means for reciprocating one of said forks transversely and means for giving a double reciprocating movement to the other of said forks substantially as specified.

4. In a peach pitting and splitting machine, the combination with an intermittently-rotatable knife carrier or wheel, a series of knives, having curved or U-shaped cutting edges mounted thereon, of a coöperative movable knife having a curved or U-shaped cutting edge, and a pair of movable pitters or forks reciprocating transversely to the plane of said knives for freeing the pit first from one half and then from the other half of the peach, and a guide or chute for aiding in sticking or placing the peaches one by one on the knives of the carrier, and means for reciprocating said forks transversely substantially as specified.

5. In a peach pitting and splitting machine, the combination with an intermittently-movable carrier having a plurality of knives mounted thereon, of a coöperating opposing movable knife, means for moving said carrier to bring the several knives thereon successively into registry with said opposing knife and a pair of movable pitters or forks reciprocating transversely to the plane of the knives, and means for reciprocating said forks transversely substantially as specified.

6. In a peach pitting and splitting machine, the combination with an intermittently-movable carrier having a plurality of knives mounted thereon, of a coöperating opposing movable knife, and a pair of movable pitters or forks reciprocating transversely to the plane of the knives, one of said pitters or forks having a double reciprocating movement, means for reciprocating one of said forks transversely and means for giving a double reciprocating movement to the other of said forks substantially as specified.

7. In a peach pitting and splitting machine, the combination with an intermittently-movable carrier having a plurality of U-shaped knives mounted thereon, of a coöperating opposing movable knife, means for moving said carrier to bring the several knives thereon successively into registry with said opposing knife a pair of movable pitters or forks reciprocating transversely to the plane of the knives, one of said pitters or forks having a plurality of tines, and means for reciprocating said forks transversely substantially as specified.

8. In a peach pitting and splitting machine, the combination with an intermittently-rotatable knife carrier or wheel, a series of knives, having curved or U-shaped cutting edges mounted thereon, of a coöperating movable knife having a curved or U-shaped cutting edge, a pair of movable pitters or forks reciprocating transversely to the plane of said knives for freeing the pit first from one half and then from the other half of the split peach, and a device for guiding the peaches one by one to the knives on the carrier, and means for reciprocating said forks transversely substantially as specified.

9. In a peach pitting and splitting machine, the combination with an intermittently-rotatable knife carrier or wheel, a series of knives, having curved or U-shaped cutting edges mounted thereon, of a coöperating movable knife having a curved or U-shaped cutting edge, a pair of movable pitters or forks reciprocating transversely to the plane of said knives for freeing the pit first from one half and then from the other half of the split peach, and a pair of strippers for stripping the split halves of the peach from the forks or pitters, and means for reciprocating said forks transversely substantially as specified.

10. In a peach pitting and splitting machine, the combination with an intermittently-rotatable knife carrier or wheel, a series of knives, having curved or U-shaped cutting edges mounted thereon, of a coöperating movable knife having a curved or U-shaped cutting edge, a pair of movable pitters or forks reciprocating transversely to the plane of said knives for freeing the pit first from one half and then from the other half of the split peach, one of said pitters or forks having a plurality of tines, and a pair of strippers for stripping the split halves of the peach from the forks or pitters, and means for reciprocating said forks transversely substantially as specified.

11. In a peach pitting and splitting machine, the combination with an intermittently-rotatable knife carrier or wheel, a series of knives, having curved or U-shaped cutting edges mounted thereon, of a coöperating movable knife having a curved or U-shaped cutting edge, a pair of movable pitters or forks reciprocating transversely to the plane of said knives for freeing the pit first from one half and then from the other half of the split peach, one of said pitters or forks having a double reciprocating movement at each operation, and a pair of strippers for stripping the split halves of the peach from the forks or pitters, means for reciprocating one of said forks transversely and means for giving a double reciprocating movement to the other of said forks substantially as specified.

12. In a peach pitting and splitting machine, the combination with an intermittently-rotatable knife carrier or wheel, a series of knives, having curved or U-shaped cutting edges mounted thereon, of a coöperative movable knife having a curved or U-shaped cutting edge, a pair of movable pitters or forks reciprocating transversely to the plane of said knives for freeing the pit first from one half and then from the other half of the peach, a guide or chute for aiding in sticking or placing the peaches one by one on the knives of the carrier, and a pair of strippers for stripping the split halves of the peach from the forks or pitters, and means for reciprocating said forks transversely substantially as specified.

13. In a peach pitting and splitting machine, the combination with an intermittently-movable carrier having a plurality of knives mounted thereon, of a coöperating opposing movable knife, means for moving said carrier to bring the several knives thereon successively into registry with said opposing knife a pair of movable pitters or forks reciprocating transversely to the plane of the knives, and a pair of strippers for stripping the split halves of the peach from the forks or pitters, substantially as specified.

14. In a peach pitting and splitting machine, the combination with an intermittently-movable carrier having a plurality of knives mounted thereon, of a coöperating opposing movable knife, a pair of movable pitters or forks reciprocating transversely to the plane of the knives, one of said pitters or forks having a double reciprocating movement, and a pair of strippers for stripping the split halves of the peach from the forks or pitters, means for reciprocating one of said forks transversely and means for giving a double reciprocating movement to the other of said forks substantially as specified.

SAMUEL J. DUNKLEY.

Witnesses:
H. M. MUNDAY,
EDMUND ADCOCK.